United States Patent [19]

Spensberger et al.

[11] 4,359,301

[45] Nov. 16, 1982

[54] MACHINE FOR THE PRECISION WORKING, FOR EXAMPLE SHAVING, OF TOOTH FLANKS

[75] Inventors: Johann Spensberger, Poing; Heinrich Fischer, Munich, both of Fed. Rep. of Germany

[73] Assignee: Carl Hurth Maschinen- und Zahnradfabrik GmbH & Co., Munich, Fed. Rep. of Germany

[21] Appl. No.: 168,218

[22] Filed: Jul. 10, 1980

[30] Foreign Application Priority Data

Jul. 31, 1979 [DE] Fed. Rep. of Germany ....... 2930997
Mar. 27, 1980 [DE] Fed. Rep. of Germany ....... 3011802

[51] Int. Cl.³ ................ B23F 9/02; B23F 19/06
[52] U.S. Cl. ...................... 409/3; 29/159.2; 51/32; 51/52 R; 72/74; 72/101; 409/32; 409/34; 409/37; 409/49
[58] Field of Search .............. 409/2, 3, 31, 32, 33, 409/34, 36, 37, 49; 29/159.2; 72/74, 101, 102, 452; 51/32, 52 R

[56] References Cited

U.S. PATENT DOCUMENTS 2,557,462  6/1951  Praeg .................................. 409/33
3,188,915  6/1965  Hurth .................................. 409/33

FOREIGN PATENT DOCUMENTS 176169  12/1965  U.S.S.R. ............................... 409/49
448087  11/1974  U.S.S.R. ............................... 51/52 R

Primary Examiner—Z. R. Bilinsky
Attorney, Agent, or Firm—Blanchard, Flynn, Thiel, Boutell & Tanis

[57] ABSTRACT

A machine for precision working, for example shaving, of the tooth flanks of a toothed workpiece supported rotatably on a machine frame. A tool carrier carries a multi-toothed tool, for example a shaving cutter, and is supported substantially above the workpiece for rotative adjustment of the crossing of the axes of the workpiece and tool, about an axis perpendicular to the workpiece axis. The tool carrier is guided movably in a guide carrier and is driven for longitudinal feeding of the tool. The guide carrier is suspended swingably about a horizontal axis for spherical or conical tooth working. The guide carrier is supported pendantly from a swivel plate which is swingable and lockable about an axis perpendicular to the workpiece axis for adjusting the feed direction. The tool carrier is guided by a guide arm which is adjustable in its inclination and is securable by a pivot member on the swivel plate. Structure is provided for cancelling a portion of the feed movement of the tool toward the workpiece, and the guide arm comprises an inclined swivel guide bar which produces such feed movement of the tool toward the workpiece in response to longitudinal movement of the tool carrier.

16 Claims, 14 Drawing Figures

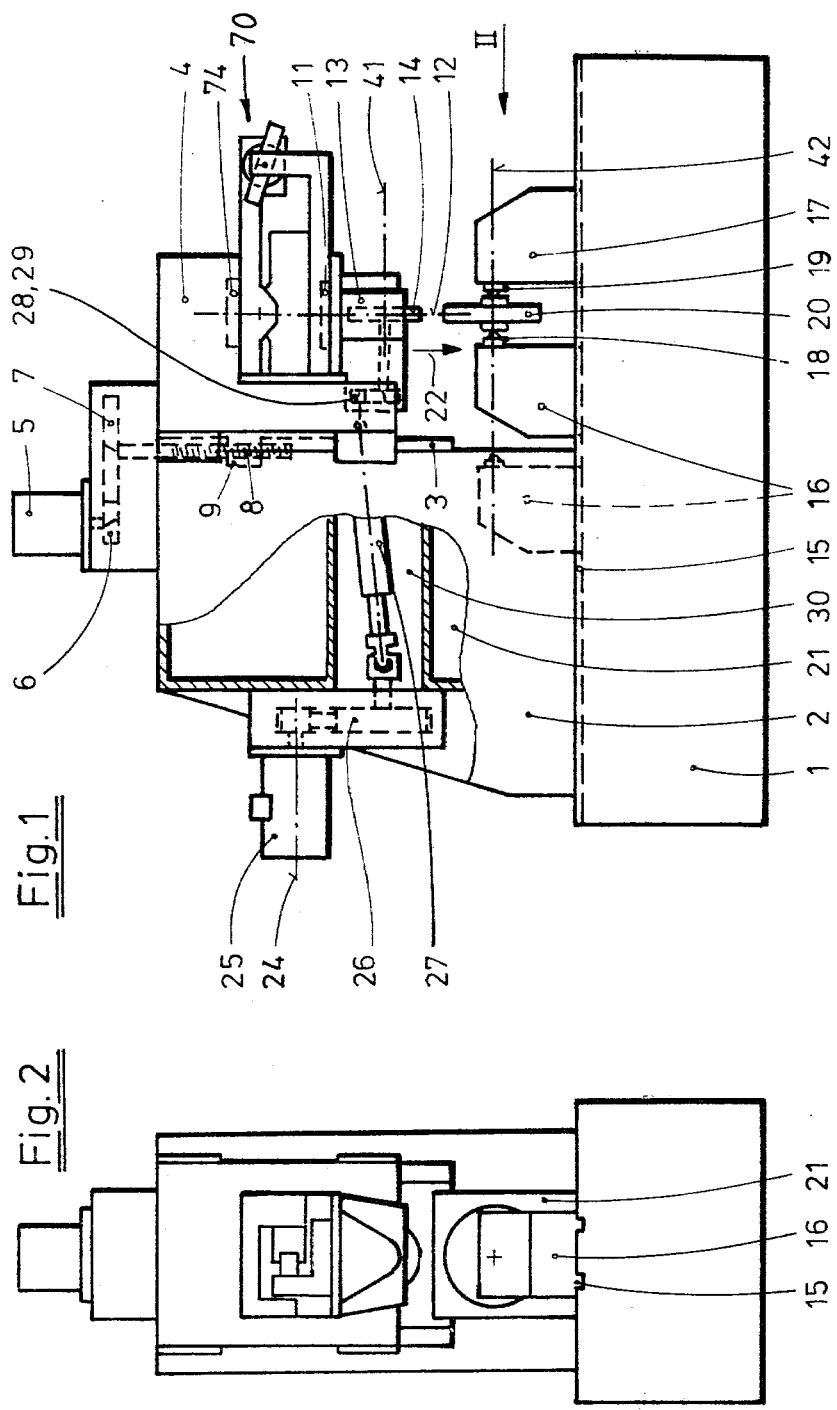

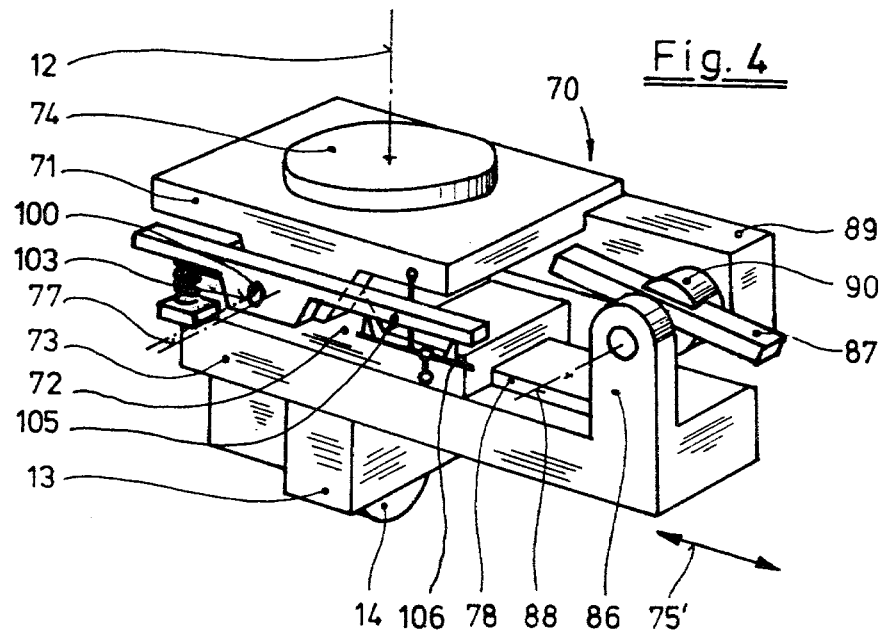
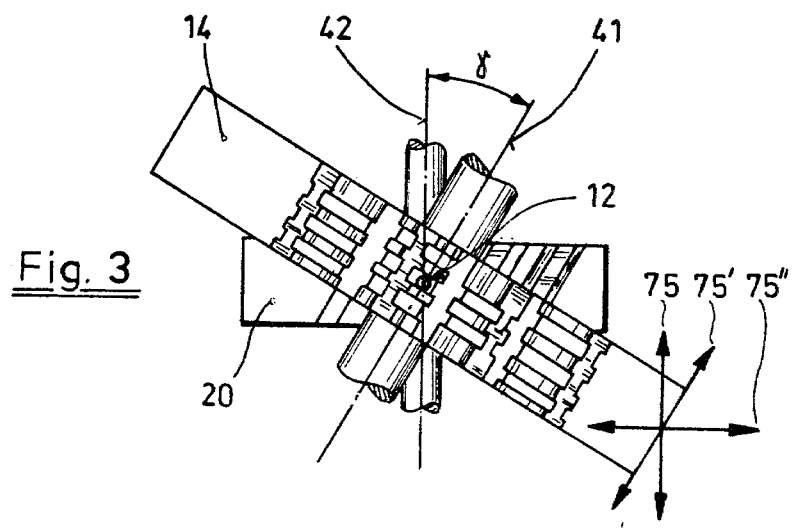

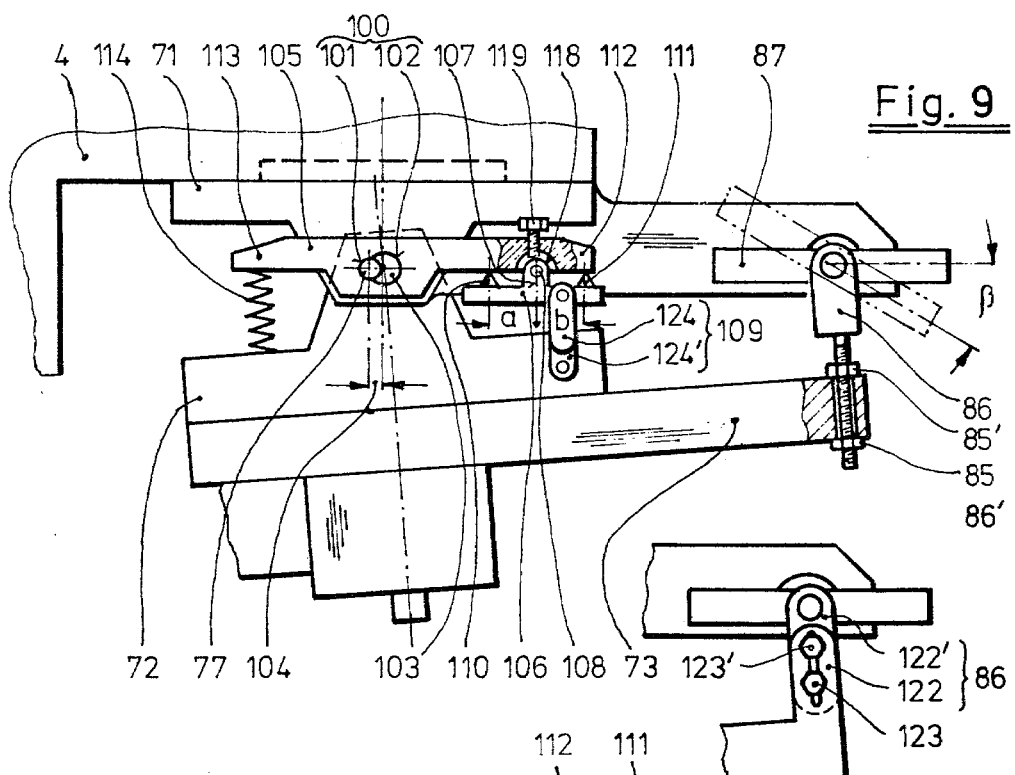
Fig. 9
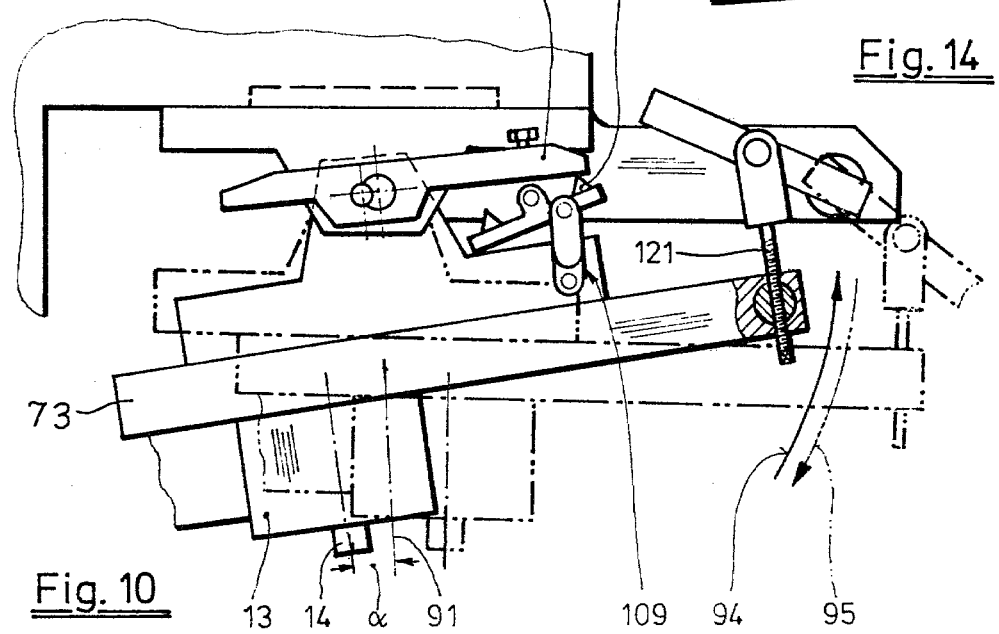
Fig. 14
Fig. 10

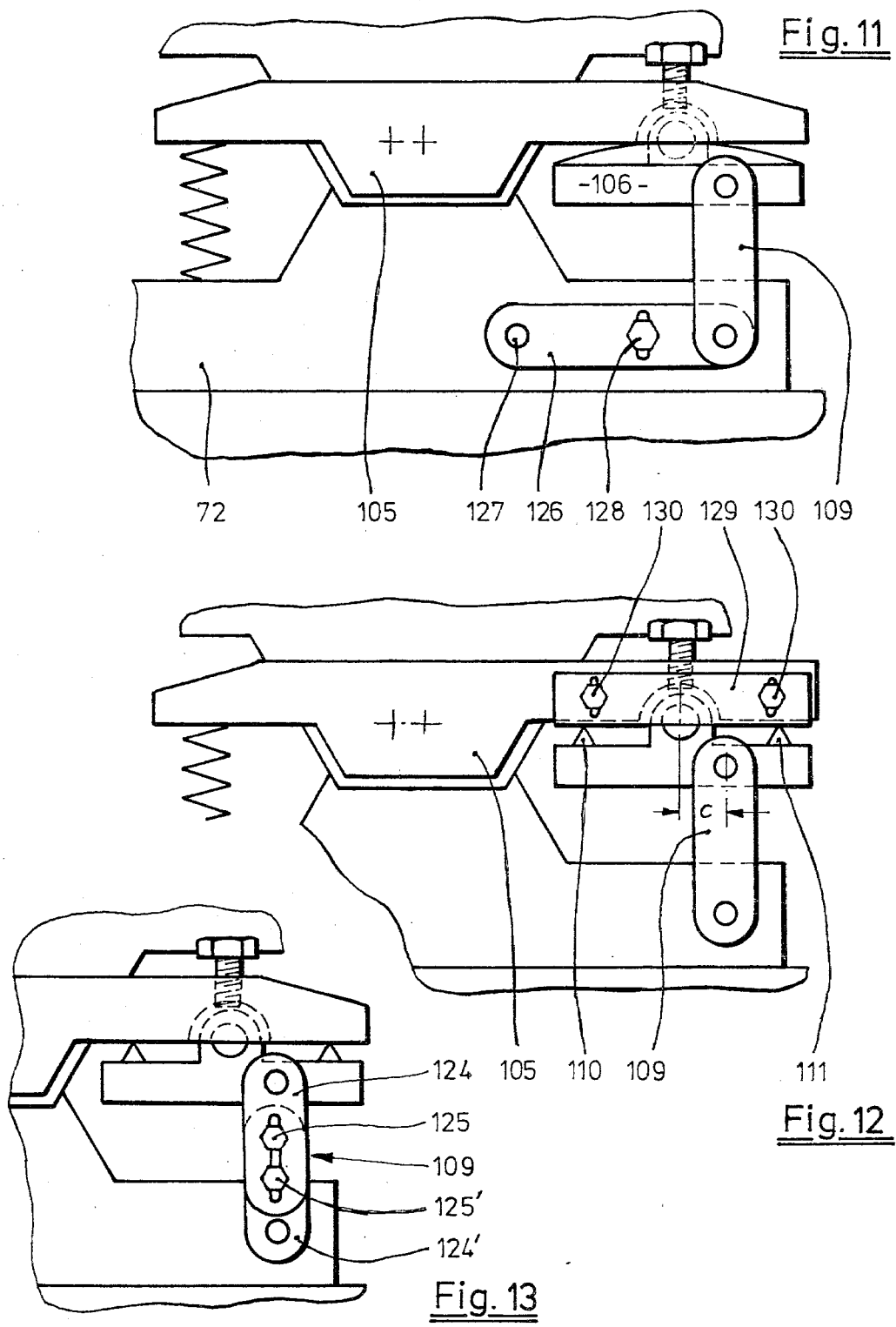

MACHINE FOR THE PRECISION WORKING, FOR EXAMPLE SHAVING, OF TOOTH FLANKS

CROSS REFERENCE TO RELATED APPLICATION

This application is related to commonly assigned copending application Ser. No. 129,769 filed Mar. 12, 1980.

FIELD OF THE INVENTION

The invention relates to a machine for the precision working (i.e., machining), for example shaving, of the tooth flanks of a toothed workpiece.

BACKGROUND OF THE INVENTION

A machine is known for the precision shaving of tooth flanks of a toothed workpiece from copending application Ser. No. 129 769 filed Mar. 12, 1980. Because of its type of design it is suited for the manufacture of spherical (crowned) or conical tooth flanks. The tool carrier which carries out the feed movement is on the one side suspended tiltably about a horizontal axis and on the other side guided on a fixed part through an adjustably inclined swivel guide bar. Depending on the inclination of the swivel guide bar, the tool carrier and thus the tool is inclined during feeding and at the same time carries out a feed movement toward the workpiece.

As a rule the plane of rotation of the tool is directed toward the axial center of the workpiece. In the case of wide workpieces it is often desired to enlarge, at least toward the end of the feed the inclined position, namely the camber of the tool or, however, to reduce the mentioned feed movement, for example, to obtain a wider pressure surface on the tooth flanks. This is easily possible with suitably curved swivel guide bars. However, such curved swivel guide bars are expensive to manufacture and require in addition special developments on the grooved pivot member which guides them.

Therefore, a resultant purpose of the present invention is to provide a simpler control correcting device for spherical crowned shaving and similar precision-working methods, which can be applied to the known machine.

The objects and purposes of the invention are met by providing a means for cancelling a portion of the feed movement of the tool toward the workpiece, wherein the reduction of feed movement depends on the tilting movement of a guide carrier which supports the tool carrier for longitudinal feeding of the tool along the workpiece surface.

In a further development of the invention, an eccentric pivot pin pivotally supports the guide carrier and thus the tool for pivoting with respect to one axis of such eccentric pivot pin, whereas an eccentric lever is responsive to longitudinal movement of the tool with respect to the guide carriage for causing such eccentric lever to rotate the eccentric pivot bolt and thereby raise the guide carriage and tool independent of the direction in which longitudinal tool movement occurs. Thus, the tool can be provided with a curved path along the tooth to be machined on the workpiece. The tool at any point along such curved path is perpendicular to or at any different desired angle to the workpiece tooth to be machined. The amount of such reduction in the feed movement of the tool toward the workpiece can be changed by changing of the means driving the eccentric lever, e.g., means such as cams or a template of shape depending on the desired finished shape of the workpiece tooth, which cams or templates can be manufactured more easily than providing a swivel guide bar which is curved in two directions.

The means for correcting, or partial cancelling, of tool feed movement toward the workpiece can if desired be rendered ineffective by supporting the eccentric lever such that the cams or template are not effective to vary the motion of the eccentric lever.

Workpieces with conical or spherical-conical (crowned conical) teeth have not been capable of being worked on a machine of the aforementioned type having a straight swivel guide bar. Accordingly, the basic purpose of the invention is broad enough to encompass a structure which permits the working of such teeth. To this end, an arm which projects from the tool carrier, and which carries the swivel guide bar, is made adjustable in length. A change in such length of arm results in an inclined position of the tool carrier and thus also of the guide carrier supporting the latter. Longitudinal movement of the tool carrier thereby is inclined to the workpiece axis in correspondence to the desired conicity of the workpiece tooth to be formed. In this mode the aforementioned cams and template are not needed.

Furthermore, in order to be able to produce spherical-conical teeth, a control lever connects through a steering link to the guide carrier, with the distance between the hinge point of the steering link on the control lever and the bearing surface of the eccentric lever on the camming means being adjustable. The adjustability of the steering link can be carried out by making the steering link adjustable in length between its two hinge points, by adjusting the location of the hinge point of the steering link on the guide carrier, or by employing an adjustable bar on the eccentric lever to engage the cams. In order to obtain spherical-conical teeth, the guide carrier or the tool carrier must be positioned so as to be inclined to its initial position. At the same time, however, it is necessary for the eccentric lever to be positioned parallel to the control lever, which carries the cams or template, in order to provide the conical teeth as a result of the aforementioned inclined positioning and to also crown such teeth in correspondence to the position of the cams or form of the template.

BRIEF DESCRIPTION OF THE DRAWINGS

The invention will be described in greater detail hereinafter in connection with FIGS. 1 to 14, in which:

FIG. 1 is a front view of one exemplary embodiment of a machine according to the invention, FIG. 2 is a side view of the same machine in the direction of the arrow II in FIG. 1, FIG. 3 is a bottom view of a tool of the machine of FIG. 1, which cooperates at crossed axes with the workpiece, FIG. 4 is a three-dimensional illustration of the adjusting carriage of the machine of FIG. 1, FIG. 9 illustrates another different embodiment of the adjusting carriage in a schematic view similar to FIG. 5, FIG. 10 illustrates the adjusting carriage of FIG. 9 with different positions of the feed carriage, FIGS. 11 and 12 illustrate different embodiments of the adjusting carriage in schematic views similar to an enlarged fragment of FIG. 9, FIG. 13 is an enlarged fragment of FIG. 9, and FIG. 14 illustrates a further modification of the adjusting carriage.

DETAILED DESCRIPTION

Figure 5:
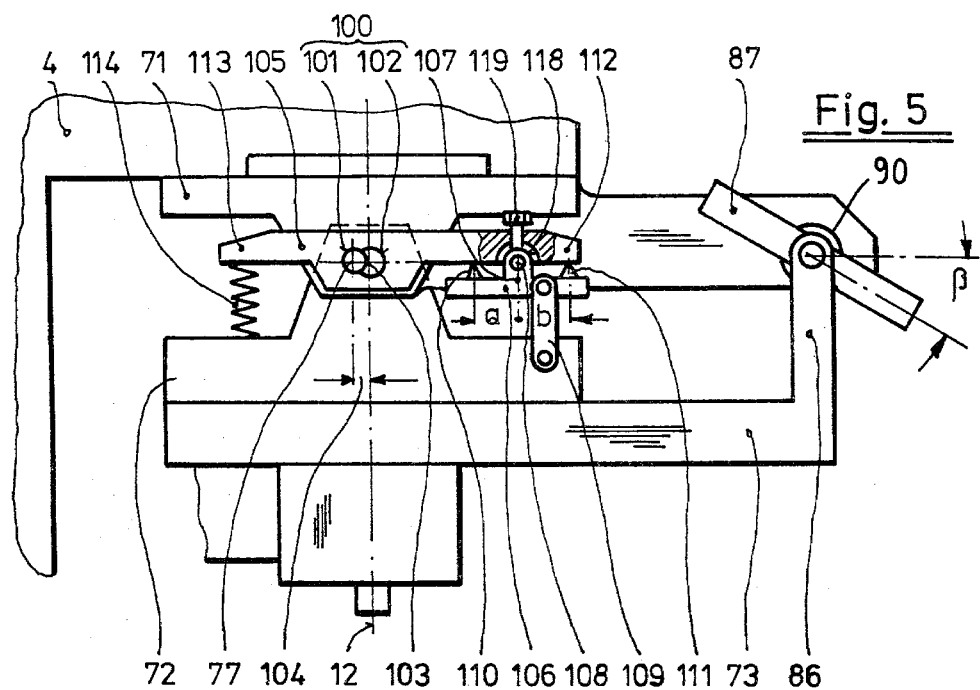
FIG. 5 is a schematic view of the adjusting carriage of FIG. 4.

A vertical column 2 is rigidly mounted at one end on a machine base 1 (FIG. 1). A vertical carriage 4 is guided for vertical adjustment on the column 2 in a vertical slide bar 3 which faces toward the free end of the base. The vertical carriage 4 at least partially projects over said free base end. A stepping motor 5 is arranged on the column 2 for vertically adjusting the vertical carriage 4, which stepping motor drives a screw 8 through a spur gear system 6,7. Said screw 8 acts onto a spindle nut 9 which is connected fixedly to the vertical carriage 4. The vertical carriage 4 has on its underside a so-called adjusting carriage 70, which will be discussed later. A tool head 13, which is rotatable about a vertical axis 12, is received on the underside of the adjusting carriage 70 in a circular guide 11. (Said axis 12 is identical to the common normal of tool 14 and workpiece 20.) The tool 14 is rotatably supported in the tool head 13. The tool 14 can be a conventional shaving cutter or a different tool which is suited for precision working. It projects downwardly from the tool head.

Two tailstocks 16,17 are longitudinally movably arranged and fixedly positionable in longitudinal guideways 15 (FIG. 2) on the machine bed 1. The devices which are needed for this are known and are therefore not illustrated. The tailstocks 16,17 are equipped with also known devices, which are therefore not illustrated in detail, for example spindle sleeves 18,19, for the automatic chucking of a workpiece 20. In order to be able to also receive longer, for example wavelike, workpieces between the tailstocks 16,17, the tailstock 16 which is arranged next to the column 2 can be moved into its broken line position of FIG. 1, namely into a recess 21 of the column 2.

To machine the workpiece 20, the tool 14 approaches the workpiece in the direction of the arrow 22 and engages same. The devices which are provided for this movement, like stepping motor 5 and vertical carriage 4, have already been described above. A drive motor 25 is mounted on the column 2 for providing the rotary drive of the tool 14, which drive motor 25 drives through a toothed belt 26 and a uniform velocity drive shaft 27 and also a spur gear system 28,29 which is already provided in the tool head 13. An electric motor or a regulatable hydraulic motor can be used as a drive motor 25. In this case the toothed belt 26 is possibly not needed. The drive shaft 27 extends through a passage 30 in the column 2.

The adjusting carriage 70 (FIG. 4) consists substantially of three parts which are movably arranged relative to one another: a swivel plate 71, a guide carrier 72 and a feed carriage 73. The swivel plate 71 is pivotally received in and fixedly securable to an initially tensioned circular guide 74 in the vertical carriage 4 for pivotal adjustment of the swivel plate 71 about a vertical axis, which axis coincides with the axis 12. Thus, the feed direction 75,75',75" (FIG. 3) of the tool 14 can be adjusted as desired during parallel, diagonal or underpass shaving. The guide carrier 72 is suspended for eccentric tilting about a horizontal axis 77 on the swivel plate 71 on bolts 100. This will be discussed in greater detail later on. The guide carrier 72 receives on its underside, in an initially tensioned longitudinal guideway 78, the feed carriage 73. Initially tensioned longitudinal guideways are also known, as are the above-mentioned initially tensioned circular guides, and so they do not need to be described in greater detail here. The longitudinal guideway 78 is directed transverse to the axis 77. The longitudinal guideway 78, like the slide bar 3, is mounted, due to the tool 14 being arranged above the stationarily received workpiece 20, high enough that such longitudinal guideway lies substantially outside of the chip area. This location assures that chips cannot settle at least on the sections which are used during one working cycle and thus wear of the guideways cannot occur. Also the circular guide 11 of the tool head and the circular guide 74 of the swivel plate lie above the chip area and thus cannot become dirty.

As has already been mentioned, the tool head 13 is pivotable about a vertical axis in the circular guide 11 in the so-called adjusting carriage 70, and more particularly in the feed carriage 73. In this way, a crossed-axes angle γ (FIG. 3) can be adjusted between tool axis 41 and workpiece axis 42. The inclination of the tool axis 41 with respect to the motor axis 24, which inclination exists at the same angle in a horizontal plane, is adapted to by the drive shaft 27, as are the different elevational positions and distances of the tool axis 41 with respect to the motor axis 24 due to different workpiece dimensions and the vertical and horizontal movements of the tool during each working cycle.

The feeding of the tool to the workpiece in the sense of a reduction in the distance between their centers and the disengagement of workpiece and tool are done with the stepping motor 5. Its capability of changing to different speeds, in cooperation with the spur gearing 6,7 and the low friction slide bar 3, permits both a finely adjustable feed and also a quick retraction of the tool. To hold the vertical carriage 4 in a certain position, conventional and therefore not illustrated devices, for example hydraulic clamping mechanisms, are provided. To produce the feed movement 75,75',75", a double-acting hydraulic cylinder (not illustrated) is provided in the guide carrier 72, the piston rod of which hydraulic cylinder (also not illustrated) is connected to the feed carriage 73. The feed carriage is moved to the left or right by this device, depending on the pressurization of the cylinder chambers. In this manner it is possible to move the tool 14, for example a shaving member, back and forth across the entire width of the workpiece. Suitable control means for the last-mentioned movement of the tool across the workpiece and for the previously-mentioned feeding of the tool to the workpiece (in the sense of center-distance reduction and separation), and for doing so in an automatic sequence of operation, are known, and therefore do not need to be described or illustrated here.

In order to be able to produce crowned, or rounded, teeth on the workpiece 20 during the feed movement 75,75'75" of the tool 14, a simple first control device is mounted on the adjusting carriage 70 (FIG. 5). The feed carriage 73 has at one end an upwardly directed arm 86, at the free end of which a guide rule, or swivel guide bar, 87 is mounted. The swivel guide bar is pivotable about a horizontal axis 88, which is directed parallel to the horizontal axis 77, and can be fixedly positioned on the arm 86. The swivel plate 71 has an arm 89 (FIG. 4), to the free end of which is freely rotatably pivoted a grooved pivot member 90. The swivel guide bar 87 is guided in the groove in said pivot member 90. When the swivel guide bar 87 is clamped in a horizontal position of adjustment, the feed carriage 73 carries out a normal, rectilinearly extending, back and forth movement. If, however, the swivel guide bar 87 is adjusted to be inclined in the clockwise direction at any desired selectable angle $\beta$ (as illustrated in FIG. 5), then the following happens: During movement of the feed carriage 73 to the left (toward its solid line position in FIG. 6), the arm 86 is moved to the left and at the same time is lifted due to the pivot member 90 guiding the swivel guide bar 87. Due to the suspension of the feed carriage 73 by the guide carrier 72 on the swivel plate 71, the feed carriage 73 and thus also the guide carrier 72 carry out a counterclockwise tilting movement shown by the arrow 94. During movement of the feed carriage 73 to the right (toward its dotted line position in FIG. 6), however, the arm 86 is lowered, and the feed carriage 73 and the guide carrier 72 carry out a clockwise tilting movement shown by the arrow 95. By such tilting movements of the feed carriage 73, an inclined position of the tool 14 relative to the workpiece is achieved. This inclined position is also identified as camber. The angle $\alpha$ of camber (FIG. 6) can be varied by changing the angle $\beta$, at which the swivel guide bar 87 is inclined. The plane of rotation 91 of the tool 14 is as a rule directed to the centerpoint of the projection of the tooth width on the workpiece axis. This is true for normal, for conical, for spherical and for spherically conical teeth. In the case of wide workpieces, where a long feed path is needed (for example to obtain a wider contact surface), often at least toward the end of each movement it is necessary to reduce the feed of the tool 14 to the workpiece 20, namely the feed resulting from the tilting movement of the tool head 13. For this the hereinafter described second control device is used.

A swing bolt 100 (FIG. 5) has first and second diameter portions 101 and 102 distributed along its length. The swing bolt 100 is supported in the swivel plate 71 by its first diameter portion 101. The swing bolt 100 is received in the guide carrier 72 by its second diameter portion 102 which is offset from the first. The axis 103 of the diameter portion 102 is offset at a distance 104 with respect to the horizontal axis 77, which at the same time is the axis of the diameter portion 101, and lies in one plane with the already-mentioned swivel axis 12. An eccentric lever 105 is in addition fixedly mounted on the swing bolt 100 for rotation therewith.

Figure 6:
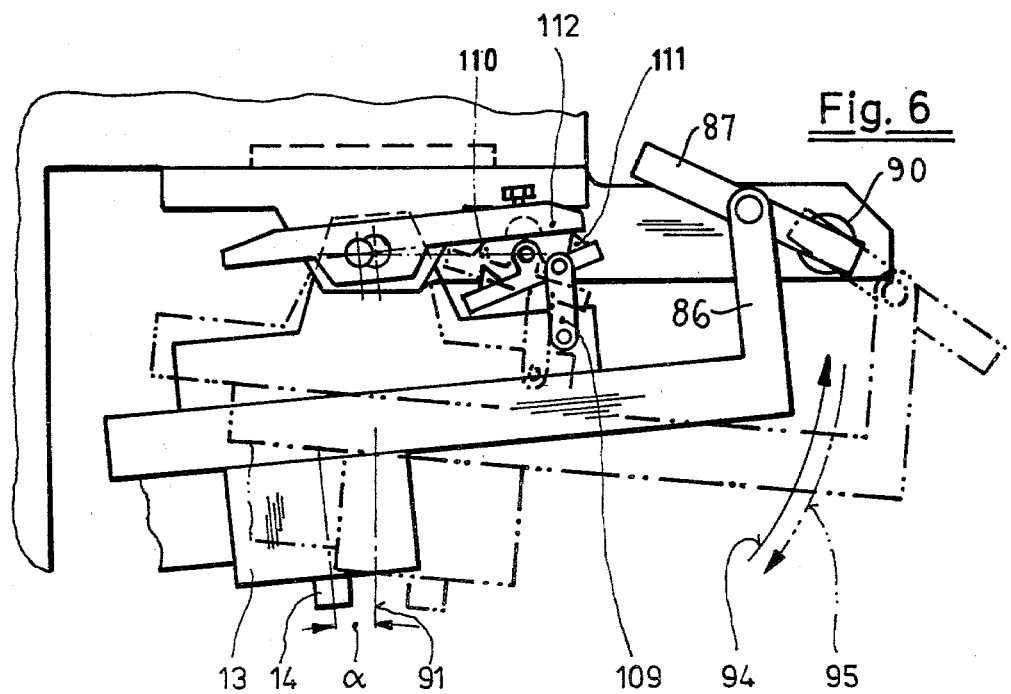
FIG. 6 is a view similar to FIG. 5 showing the same adjusting carriage with different positions of the feed carriage.

A control lever 106 is mounted by a plate 107 tiltably about an axis 108 on the swivel plate 71 and is hinged to the guide carrier 72 through a steering link 109. On opposite sides of the plate 107 the control lever 106 mounts a respective cam 110,111, on which rests an arm 112 of the eccentric lever 105. The other arm 113 of eccentric lever 105 is loaded by a pressure spring 114, which is supported on the guide carrier 72. The spring 114 assures that the eccentric lever 105 will rest on the cams. This device operates as follows: If the feed carriage 73 is moved for example to the left, then, as already mentioned, it and the guide carrier 72 carry out a counterclockwise tilting movement 94. This tilting movement is transmitted through the steering link 109 onto the control lever 106, which is also urged to a counterclockwise tilting movement about the axis 108. The arm 112 of the eccentric lever 105 is thereby lifted up by the cam 111 and thus the guide carrier 72 is also lifted due to its eccentric suspension at 102. By lifting the guide carrier 72, the tool is also moved correspondingly upwardly (FIG. 6). If the feed carriage 73 is instead moved to the right, then it and the guide carrier 72 carry out the already-mentioned clockwise tilting movement 97. This movement is transmitted through the steering link 109 onto the control lever 106, which is now urged to carry out a clockwise tilting movement. The arm 112 of the eccentric lever 105 is thereby again lifted (this time by the cam 110), which again causes the tool to be moved upwardly. The combination of the steering link 109, control lever 106, cam 110 or 111, eccentric lever 105 and eccentric suspension 100 of the guide carrier 72 causes each tilting of the guide carrier 72, independently of the tilting direction, to move the eccentric lever arm 112 upwardly and thereby cancel a portion of the feed movement. By adjusting one or both of the distances "a" and "b" of the cams 110 and 111 from the axis 108, the degree of movement of the eccentric lever 105 can be preselectably adjusted.

Figure 7:
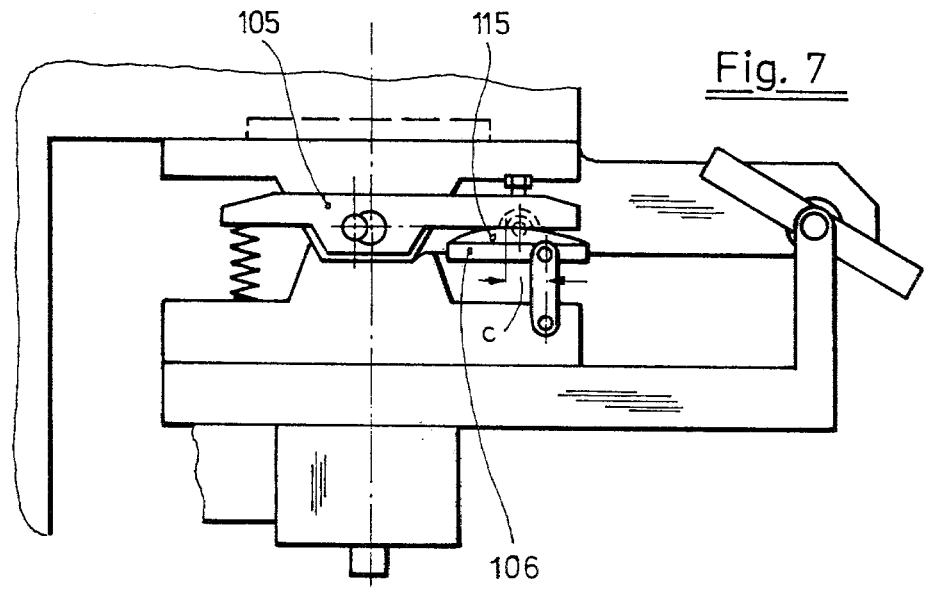
FIGS. 7 and 8 illustrate different embodiments of the adjusting carriage in schematic views similar to FIG. 5.

The movement of the eccentric lever 105 can also occur through a template 115 which is secured on the control lever 106 in place of the cams (FIG. 7), on which template 115 the eccentric lever 105 rolls along so to speak. The curve formed by the template 115 can also be formed in approximation of at least three adjustable individual cams. A further fine adjustment or camber or rather feed is achieved, if the distance "c" is adjustable.

Figure 8:
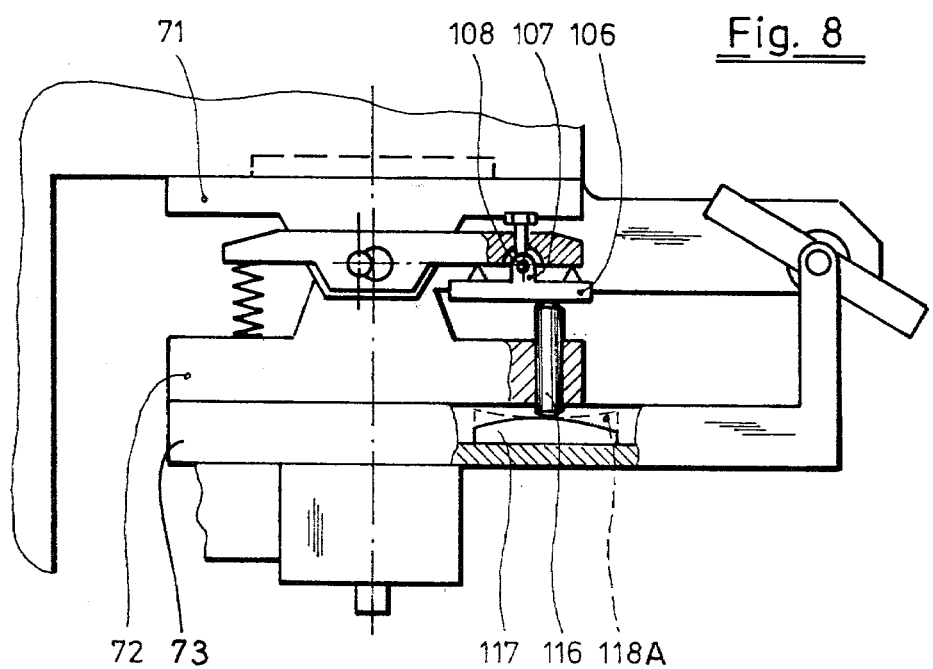

FIG. 8 illustrates a further exemplary embodiment in which, aside from tilting the guide carrier 72, the feed movement of the feed carriage 73 also is utilized for camber or feed correction. The control lever 106 is mounted by the plate 107 on the swivel plate 71 tiltably about the axis 108 as above discussed. A connecting rod 116 is vertically movably guided in the guide carrier 72. The connecting rod 116 rests its lower end on a template 117 mounted on the feed carriage 72, and its upper end on the control lever 106. During a movement of the feed carriage 73, not only is the above-described tilting movement of the guide carrier or of the feed carriage transmitted onto the control lever 106, but an additional movement can be superposed, depending on the contour of the template. Also, special forms of the crowning of the teeth can be manufactured with suitably designed templates, for example as shown in dotted lines at 118A.

If the second control or correcting device is not needed, for example during shaving of nonspherical (noncrowned) tooth flanks, the eccentric lever 105 or its arm 112 rests on the semicircular contour 118 (FIG. 5) of the plate 107, on which plate it is supported through a screw 119. The contour 118 concentrically surrounds the axis 108. The cams 110, 111 or the template 115 are then removed. A tilting of the control lever 106, for any reason whatsoever, then has no effect on the eccentric lever or the position of the workpiece, since the eccentric lever remains always at the same distance from the axis 108.

In order to machine conical teeth, the adjusting carriage must be changed from the design according to FIG. 5, which change is illustrated in FIG. 9. In FIG. 9, the arm 86 which points upwardly from the feed carriage 73 is adjustable in length. In the illustrated exemplary embodiment the lower part of the arm 86 is threaded at 86' and guided through an opening in the feed carriage 73, whereby the respectively needed length of the arm 86 can be adjusted with nuts 85,85'.

The adjustment of the length can, however, also be achieved by different means, for example by a screw 121 (FIG. 10) which is received in a threaded hole in the feed carriage 73, or by a two-part arm (FIG. 14), the two parts 122, 122' of which are connected adjustably with one another by means of screws 123,123' which extend through slotted holes therein.

As a rule the length of the arm 86 is adjusted so that the feed carriage 73 is positioned horizontally. Then it is possible, as is described earlier, to machine normal or spherical (crowned) teeth. A shortening or lengthening of the arm 86 (FIG. 9) along its length effects an inclination of the feed carriage 73 to the left (as in FIG. 9) or to the right. If the feed carriage 73—as is described above—moves to the left or right, then due to its inclined position it moves in a plane which is inclined with respect to the workpiece axis. The teeth which are to be machined thus become conical. A prerequisite for this is that the swivel guide bar 87 be adjusted to a horizontal position and clamped. If the swivel guide bar is clamped horizontally and the length of the arm 86 is adjusted so that the feed carriage 73 is positioned horizontally, then the feed carriage carries out a normal, rectilinearly extending back and forth movement.

If, however, the swivel guide bar 87, as indicated in FIG. 9, is adjusted clockwise to incline at any desired selectable angle $\beta$, then the teeth which are to be worked become spherical-conical (conical with a crown). The sequence of movement of the feed carriage 73 is analogous to that described above in connection with FIGS. 5 and 6 for spherical (crowned) teeth. First the arm 86 is adjusted to the necessary length. The feed carriage 73 assumes a corresponding inclined position, as does the guide carrier 72. The eccentric lever 105 is thereby lifted at its lever arm 112 by the steering link 109, the control lever 106 and one of the cams 110,111. For a satisfactory crowning, the eccentric lever 105 and the control lever 106 are supposed to be parallel to one another in the initial position. The steering link 109 is thereby designed so that the distance between its hinge point on the control lever 106 and the support surface of the eccentric lever 105 on the cam can be adjusted changeably. In the example of FIG. 9, the steering link 109 can be adjusted in length for this purpose between its two pivot points; for example, it can be divided in two with the two parts 124,124' (FIG. 13) connected by means of screws 125,125' which extend through slotted holes. With this device it is possible to adjust the eccentric lever and the control lever into their normal position parallel to one another in spite of the inclined feed carriage. The support of the eccentric lever 105 on the cams is again assured by the spring 114.

FIG. 11 illustrates a different possibility for the adjustment of the steering link 109. Here the steering link 109 is not directly pivoted on the guide carrier 72, but rather is pivoted on a plate 126 which is directed approximately transversely to it and which is pivotable about an axis 127 and can be secured on the guide carrier 72 by means of a screw 128. After releasing the screw 128 it is possible by swinging the plate 126 upwardly or downwardly to move the steering link 109 upwardly or downwardly and thus also the section of the control lever 106, which section carries the cam 111. When the control lever 106 is in the desired position, the screw 128 must naturally again be tightened.

Instead of adjusting the steering link 109 for adjusting the control lever 106, it is instead possible to change the support surface for the two cams 110,111 on the eccentric lever 105. For this purpose it is possible to mount a bar 129 (FIG. 12) or the like on the eccentric lever 105, which can be adjusted both vertically and also in its inclination. Again, screws 130 which penetrate through slotted holes or the like are provided for fixing the position of said bar 129.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A machine for precision working of tooth flanks on a toothed workpiece rotatably supported in a machine frame, comprising
   frame means;
   adjusting carriage means and swivel plate means for pivotally suspending said adjusting carriage means from said frame means and for movement about a first axis, said adjusting carriage means including a guide carrier suspended from said swivel plate means, a feed carriage movably mounted on said guide carrier, and a tool rotatably mounted on said feed carriage, the movement of said feed carriage effecting a movement of said tool across the width of said workpiece;
   first control means for effecting a smooth and continuously varying tilting of said feed carriage, said guide carriage and the axis of rotation of said tool in a plane about an axis perpendicular to said plane in response to a movement of said feed carriage and said tool thereon across the width of said workpiece; and
   second control means for smoothly and continuously cancelling a portion of the movement of said tool toward said workpiece occurring over a selected segment on opposite sides of a central position of said tilting movement of said tool whereby a smooth and continuously varying crowned surface is produced on said teeth of said workpiece.

2. The machine according to claim 1, wherein said second control means includes means responsive to said tilting movement of said feed carriage for effecting said cancelling movement.

3. The machine according to claim 2, wherein said second control means includes a swing bolt on said guide carrier defining an eccentric horizontal axis, said swing bolt being connected to an eccentric lever which is moved by said tilting movement of said guide carrier, and a spring for returning said eccentric lever to an original position thereof.

4. The machine according to claim 3, wherein said second control means further includes at least two cams hingedly secured to said guide carrier, on which cams rests said eccentric lever.

5. The machine according to claim 4, wherein the effective position of said cams is adjustable.

6. The machine according to claim 3, wherein said second control means includes a template hingedly secured to said guide carrier, on which template rests said eccentric lever.

7. The machine according to claim 3, wherein said second control means includes camming means arranged on a control lever, said eccentric lever resting on said camming means and acting through said swing bolt to support said guide carrier on said swivel plate for pivoting movement about said horizontal axis on said swivel plate, during nonuse of said second control means said eccentric lever is supported on a part which is fixedly connected to said control lever so that said control lever remains ineffective.

8. The machine according to claim 7, wherein said control lever is hingedly connected through a steering link to said guide carrier, the distance between the hinge point of said steering link on said control lever and a surface of engagement on said eccentric lever on said camming means is changeably adjustable.

9. The machine according to claim 8, wherein said steering link is adjustable in its length between its two hinge points.

10. The machine according to claim 8, wherein the steering link is hinged adjustably to said guide carrier.

11. The machine according to claim 8, including adjustable bar means mounted on said eccentric lever, through which said eccentric lever rests on said camming means.

12. The machine according to claim 2, wherein said responsive means is also responsive to the feed movement of said feed carriage.

13. The machine according to claim 12, wherein said second control means includes a swing bolt on said guide carrier defining an eccentric horizontal axis, said swing bolt being connected to an eccentric lever which is moved by said tilting movement of said guide carrier, and a spring for returning said eccentric lever to an original position thereof, wherein said second control means includes at least two cams which are arranged on a control lever, said control lever being hinged to a connecting rod which is movably guided on said guide carrier, on which cams rests said eccentric lever, wherein said connecting rod engages a template which is provided on said feed carriage.

14. The machine according to claim 1, wherein said tool is a shaving cutter.

15. The machine according to claim 1, wherein said first control means includes an arm on said feed carriage having a guide bar fixedly adjustably mounted thereon, and wherein said swivel plate has a pivot member guidingly receiving said guide arm therein.

16. The machine according to claim 15, wherein said first control means further includes an adjustable length arm which projects from said feed carriage and which carries said guide bar thereon.

* * * * *